US012350693B2

(12) United States Patent
Jones, Jr.

(10) Patent No.: US 12,350,693 B2
(45) Date of Patent: Jul. 8, 2025

(54) NOZZLE AND TANK ASSEMBLY

(71) Applicant: Thomas Jones, Jr., Maben, MS (US)

(72) Inventor: Thomas Jones, Jr., Maben, MS (US)

( * ) Notice: Subject to any disclaimer, the term of this patent is extended or adjusted under 35 U.S.C. 154(b) by 430 days.

(21) Appl. No.: 17/983,231

(22) Filed: Nov. 8, 2022

(65) Prior Publication Data

US 2024/0149288 A1 May 9, 2024

(51) Int. Cl.

*B05B 13/00* (2006.01)
*B05B 9/04* (2006.01)
*B05B 15/62* (2018.01)
*B05B 15/65* (2018.01)

(52) U.S. Cl.

CPC .......... *B05B 13/005* (2013.01); *B05B 9/0403* (2013.01); *B05B 15/62* (2018.02); *B05B 15/65* (2018.02)

(58) Field of Classification Search

CPC ......... B05B 15/60; B05B 15/62; B05B 15/65; B05B 9/0403; B05B 13/005; B60S 3/00; B60S 3/008; B60S 1/66; B60P 1/283; B60P 1/28

USPC ......... 239/69, 289, 302, 550, 551, 562, 566; 134/123, 58 R

See application file for complete search history.

(56) References Cited

U.S. PATENT DOCUMENTS 4,106,516 A * 8/1978 Wiegand ................. B60S 3/008 134/123
4,245,785 A 1/1981 Johansing, Jr.
5,494,502 A 2/1996 DeLong
9,073,690 B1 7/2015 Hobson
10,232,830 B2 * 3/2019 Frederick ................ B05B 9/035
11,325,569 B2 * 5/2022 Beaver ..................... B60P 1/283
2006/0124154 A1 * 6/2006 Rivalto ................... B08B 3/024 134/123
2011/0081479 A1 4/2011 Morris, Jr.
2014/0349006 A1 11/2014 Bandura

FOREIGN PATENT DOCUMENTS

EP 0915135 5/1999

* cited by examiner

*Primary Examiner* — Steven J Ganey

(57) ABSTRACT

A nozzle and tank assembly includes a dump trailer that is attachable to a truck and a fluid tank mounted to the truck. A pump is disposed on the fluid reservoir for pumping a lubricant contained in the fluid tank. A spray bar is attached to the dump trailer and the spray bar has a plurality of spray nozzles each directed into the dump trailer. A supply line is fluidly attached to the pump such that the supply line receives the lubricant when the pump is turned on. The supply line is fluidly coupled to the spray bar such that the supply line delivers the lubricant to the spray bar thereby facilitating the spray nozzles on the spray bar to spray the lubricant into the dump trailer. In this way the lubricant inhibits cargo from sticking to the dump trailer when the dump trailer is actuated into a dumping condition.

5 Claims, 5 Drawing Sheets

NOZZLE AND TANK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to nozzle and tank device and more particularly pertains to a new nozzle and tank device for spraying a lubricant into a dump trailer to inhibit cargo from sticking in the dump trailer. The device includes a fluid tank mounted to a truck, a pump mounted to the fluid tank and a spray bar integrated into a dump trailer. The spray bar is in fluid communication with the pump thereby facilitating the lubricant to be sprayed onto an interior of the dump trailer. In this way the lubricant inhibits the cargo from sticking to the dump trailer when the dump trailer is actuated for dumping.

(2) Description of Related Art Including Information Disclosed Under 37 CFR 1.97 and 1.98

The prior art relates to nozzle and tank devices including a spraying system for spraying an asphalt emulsion that includes a pair of hydraulic motors and a pair of pumps and a plurality of check valves. The prior art discloses a spray treating system that includes a rotatable spray nozzle that is rotatably disposed in a bed of a dump truck and a pump for pumping a fluid through the rotatable spray nozzle. The prior art discloses a seal coating machine that includes a wheeled hood and a spray nozzle disposed on the wheeled hood for spaying a treatment along a roadway upon which the wheeled hood is rolled. The prior art discloses a method of spraying an oil onto a material handling surface including the step of spraying oil from an elevated position.

BRIEF SUMMARY OF THE INVENTION

An embodiment of the disclosure meets the needs presented above by generally comprising a dump trailer that is attachable to a truck and a fluid tank mounted to the truck. A pump is disposed on the fluid reservoir for pumping a lubricant contained in the fluid tank. A spray bar is attached to the dump trailer and the spray bar has a plurality of spray nozzles each directed into the dump trailer. A supply line is fluidly attached to the pump such that the supply line receives the lubricant when the pump is turned on. The supply line is fluidly coupled to the spray bar such that the supply line delivers the lubricant to the spray bar thereby facilitating the spray nozzles on the spray bar to spray the lubricant into the dump trailer. In this way the lubricant inhibits cargo from sticking to the dump trailer when the dump trailer is actuated into a dumping condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
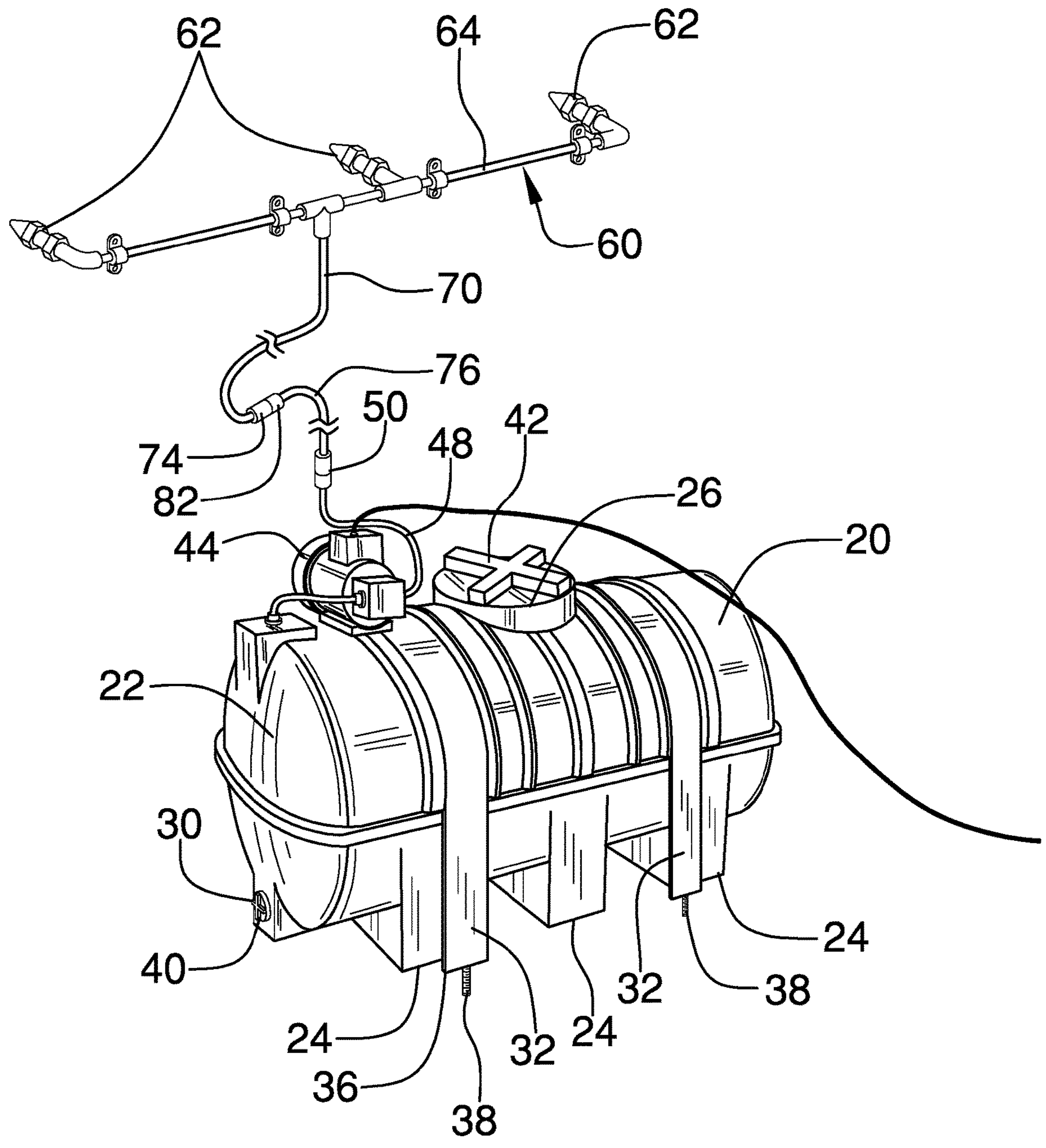
FIG. 1 is a perspective view of an embodiment of the disclosure.
Figure 2:
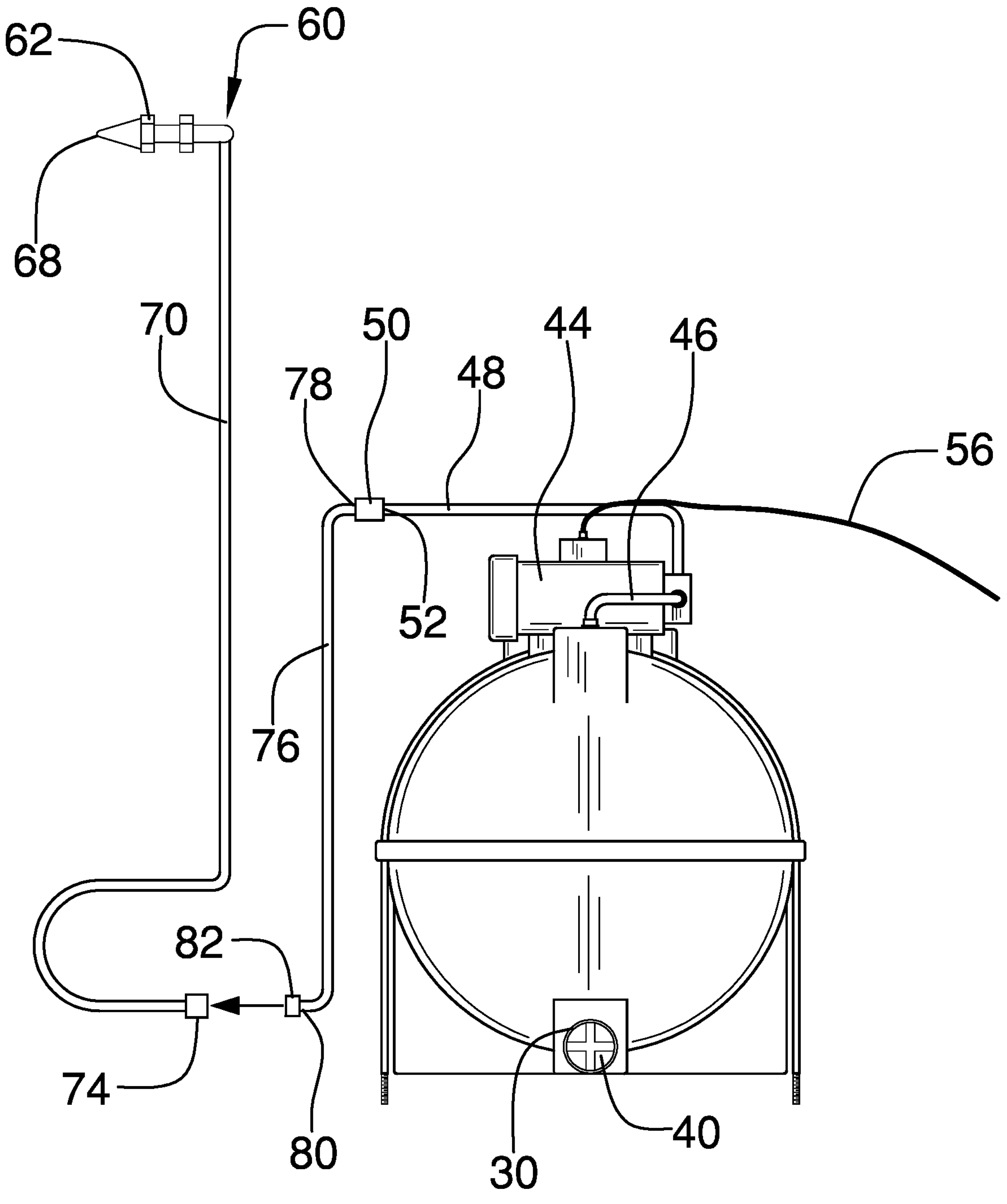
FIG. 2 is a right side view of an embodiment of the disclosure.
Figure 3:
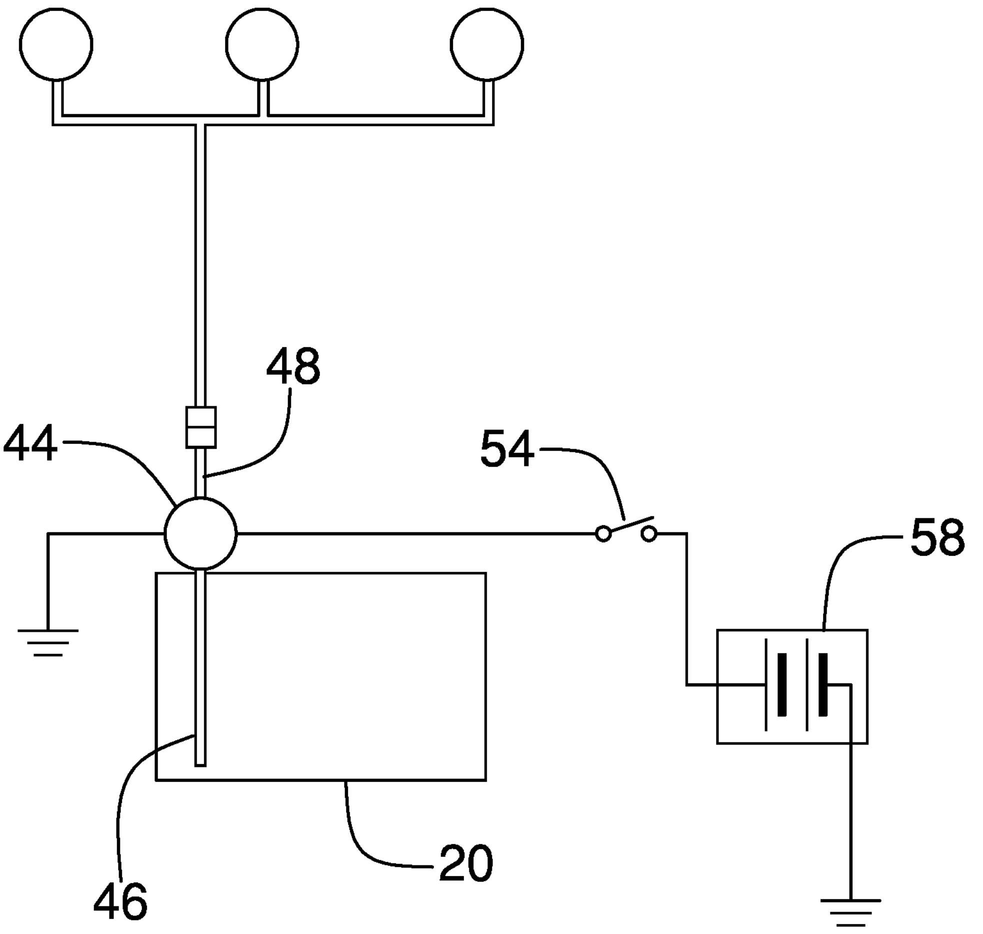
FIG. 3 is a schematic view of an embodiment of the disclosure.
Figure 4:
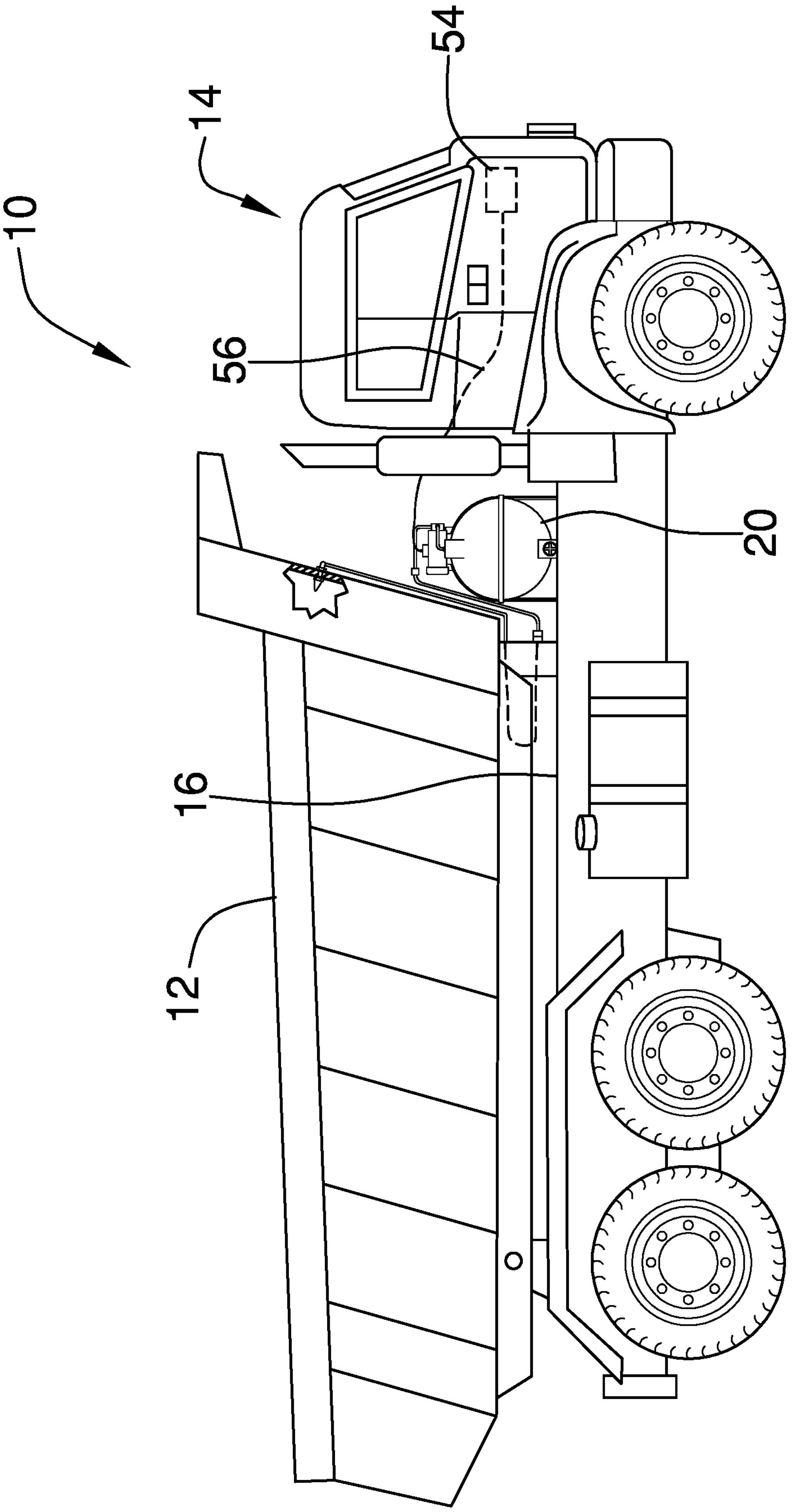
FIG. 4 is a perspective in-use view of a nozzle and tank assembly according to an embodiment of the disclosure.
Figure 5:
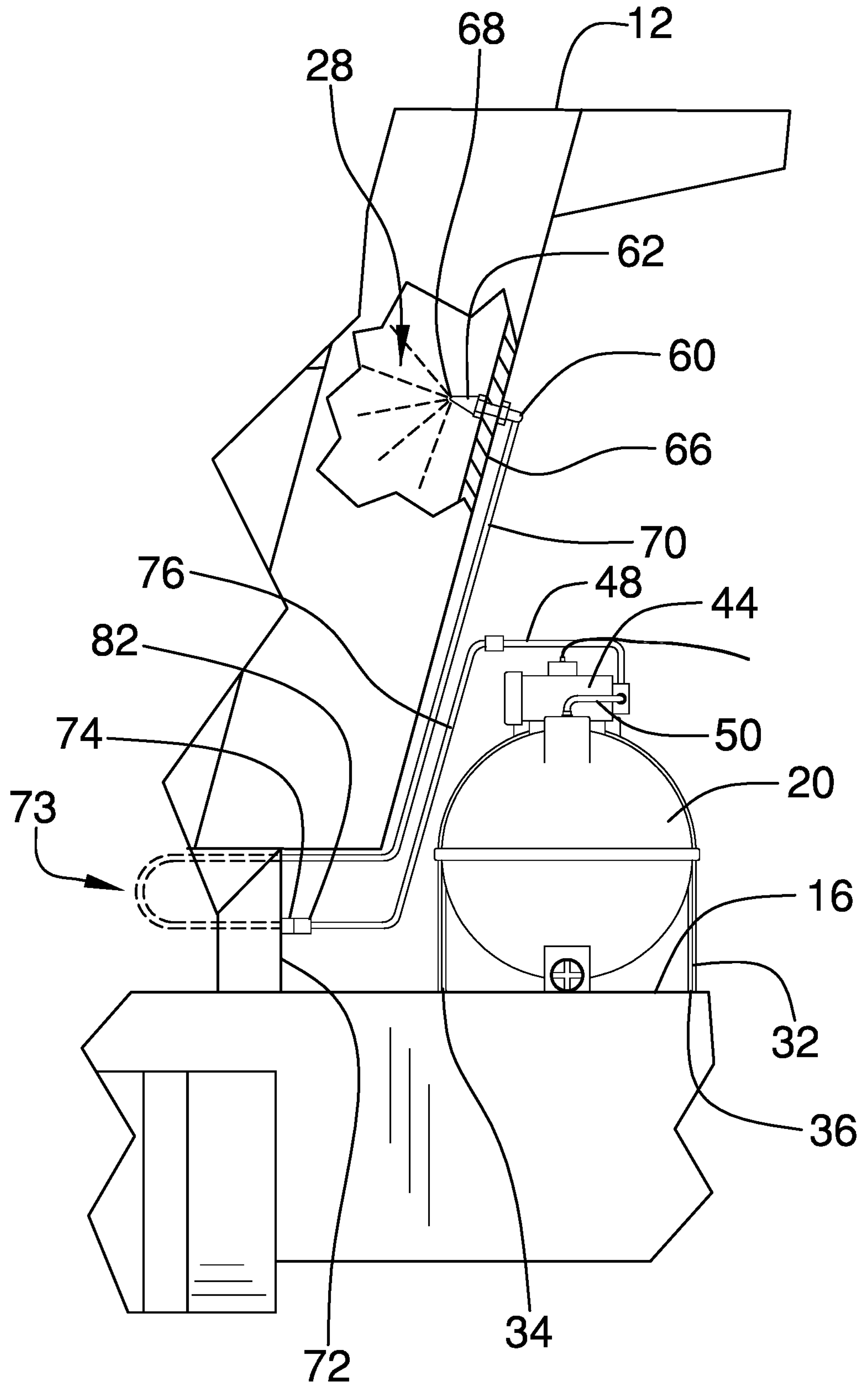
FIG. 5 is a cut-away in-use view of an embodiment of the disclosure.

With reference now to the drawings, and in particular to FIGS. 1 through 5 thereof, a new nozzle and tank device embodying the principles and concepts of an embodiment of the disclosure and generally designated by the reference numeral 10 will be described.

As best illustrated in FIGS. 1 through 5, the nozzle and tank assembly 10 generally comprises a dump trailer 12 that is attachable to a truck 14 which has a frame 16 and a cab 18. The truck 14 may be a semi truck and the dump trailer 12 may be a semi dump trailer. The truck 14 may comprise a dump truck and the dump trailer 12 may be integrally mounted to the dump truck. A fluid tank 20 is mounted to the frame 16 of the truck 14 such that the fluid tank 20 is positioned in behind the cab 18. The fluid tank 20 has an outer wall 22, the fluid tank 20 has a plurality of feet 24 that is each integrated into the outer wall 22 and each of the feet 24 rests on top of the frame 16. The outer wall 22 has a fill port 26 extending into an interior of the fluid tank 20 thereby facilitating the fluid tank 20 to be filled with a lubricant 28. Additionally, outer wall 22 has a drain 30 extending into the interior of the fluid tank 20 thereby facilitating the lubricant 28 to be drained through the drain 30.

A pair of tie down straps 32 is each draped over the outer wall 22 of the fluid tank 20 and each of the tie down straps 32 has a first end 34 and a second end 36. Each of the tie down straps 32 includes a pair of fasteners 38 that is each disposed on a respective one of the first end 34 and the second end 36. Each of the fasteners 38 on each of the tie down straps 32 is fastened to the frame 16 of the dump truck 14 for securing the fluid tank 20 on the frame 16. Additionally, each of the fasteners 38 may comprise a bolt that is threaded into the frame 16, a clamp that grips the frame 16 or any other type of releasable fastener. A drain plug 40 is removably positioned in the drain 30 in the outer wall 22 of the fluid tank 20 for closing and opening the drain 30. A lid 42 is removably engaged to the fill port 26 in the outer wall 22 of the fluid tank 20 for opening and closing the fill port 26. The fluid tank 20 may have a fluid capacity of at least 75.0 liters and the lubricant 28 may comprise oil or other type of fluid lubricant 28 and the cargo may comprise soil, gravel or any other type of granular cargo that is commonly transported in the dump trailer 12.

A pump 44 is provided and the pump 44 is disposed on the fluid tank 20. The pump 44 is in fluid communication with the fluid tank 20 for pumping the lubricant 28 in the fluid tank 20. Additionally, the pump 44 has an intake line 46 extending through the outer wall 22 of the fluid tank 20 and into the interior of the fluid tank 20 and the pump 44 has an output line 48 which has a coupling 50 disposed on a distal end 52 of the output line 48. The pump 44 urges the lubricant 28 inwardly through the intake line 46 and outwardly through the output line 48 when the pump 44 is turned on. Furthermore, the pump 44 may comprise an electric fluid pump or other similar type of pump for pumping the lubricant 28.

A control 54 is positioned within the cab 18 such that the control 54 is accessible to a driver of the dump truck 14. The control 54 is in communication with the pump 44 for turning the pump 44 on and off. A conductor 56 is electrically coupled between the control 54 and the pump 44 such that the control 54 is in electrical communication with the pump 44. Additionally, the control 54 is electrically coupled to a power source 58 comprising an electrical system of the truck 14.

A spray bar 60 is attached to the dump trailer 12 and the spray bar 60 has a plurality of spray nozzles 62 that is each directed into the dump trailer 12. The spray bar 60 has a horizontal tube 64 that is mounted to a front wall 66 of the dump trailer 12 having the horizontal tube 64 being horizontally oriented. Each of the spray nozzles 62 is fluidly coupled to the horizontal tube 64 having the spray nozzles 62 being spaced apart and being distributed along the horizontal tube 64. Each of the spray nozzles 62 extends through the front wall 66 of the dump trailer 12 such that a distal end 68 of each of the spray nozzles 62 is positioned inside of the dump trailer 12. Additionally, the distal end 68 of each of the spray nozzles 62 is substantially open for spraying the lubricant 28.

The spray bar 60 includes a feed tube 70 that is fluidly coupled to the horizontal tube 64. The feed tube 70 is routed along the front wall 66 of the dump trailer 12 to terminate at a coupling point 72 on the dump trailer 12. A first coupler 74 is attached to the coupling point 72 on the dump trailer 12 and the first coupler 74 is fluidly coupled to the feed tube 70. The first coupler 74 may comprise a quick release hose coupler or other type of releasable coupler that can receive a flowing liquid. Additionally, the feed tube 70 has a length that is sufficient to facilitate the dump trailer 12 to be lifted without placing tension in the feed tube 70 between the spray bar and the first coupler 74. Furthermore, as is most clearly shown in FIGS. 4 and 5, the feed tube 70 might be formed into a loop 73 extending along a bottom wall 75 of the dump trailer 12.

A supply line 76 is fluidly attached to the pump 44 such that the supply line 76 receives the lubricant 28 when the pump 44 is turned on. The supply line 76 is fluidly coupled to the spray bar 60 such that the supply line 76 delivers the lubricant 28 to the spray bar 60 thereby facilitating the spray nozzles 62 on the spray bar 60 to spray the lubricant 28 into the dump trailer 12. In this way the lubricant 28 can inhibit cargo from sticking to the dump trailer 12 when the dump trailer 12 is actuated into a dumping condition. The supply line 76 has a first end 78 that is fluidly coupled to the coupling 50 on the distal end 52 of the output line 48 of the pump 44, the supply line 76 is routed along the frame 16 of the truck 14 and the supply line 76 has a second end 80. A second coupler 82 is fluidly attached to the second end 80 of the supply line 76 and the second coupler 82 is releasably matable to the first coupler 74 thereby facilitating the supply line 76 to be in fluid communication with the feed tube 70 of the spray bar 60. The second coupler 82 may comprise a quick release coupler or other type of releasable coupler that can receive a flowing liquid.

In use, the fluid tank 20 is filled with the lubricant 28 and the first coupler 74 is attached to the second coupler 82. The control 54 is manipulated to turn on the pump 44 prior to filling the dump trailer 12 with the cargo. In this way the interior of the dump trailer 12 is coated with the lubricant 28 as the lubricant 28 is sprayed from the nozzles. The control 54 is manipulated to turn off the pump 44 when the dump trailer 12 is sufficiently coated with the lubricant 28 and the cargo is loaded into the dump trailer 12. In this way the cargo is inhibited from sticking to the dump trailer 12 when the dump trailer 12 is actuated to dump the cargo thereby enhancing efficiency with which the cargo can be dumped from the trailer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A nozzle and tank assembly for spraying a lubricant onto an interior of a dump truck bed thereby inhibiting cargo in the bed from sticking to the bed, said assembly comprising:

a dump trailer being attachable to a truck, said truck having a frame and a cab;

a fluid tank being mountable to said frame of said truck such that said fluid tank is positionable in behind said cab;

a pump being disposed on said fluid tank, said pump being in fluid communication with said fluid tank for pumping the lubricant in said fluid tank;

a control being positionable within said cab wherein said control is configured to be accessible to a driver of said truck, said control being in communication with said pump for turning said pump on and off;

a spray bar being attached to said dump trailer, said spray bar having a plurality of spray nozzles each being directed into said dump trailer;

a supply line being fluidly attached to said pump such that said supply line receives the lubricant when said pump is turned on, said supply line being fluidly coupled to said spray bar such that said supply line delivers the lubricant to said spray bar thereby facilitating said spray nozzles on said spray bar to spray the lubricant into said dump trailer wherein said lubricant is configured to inhibit cargo from sticking to said dump trailer when said dump trailer is actuated into a dumping condition;

wherein said fluid tank has an outer wall, said fluid tank having a plurality of feet each being integrated into said outer wall, each of said plurality of feet being capable of resting on top of said frame, said outer wall having a fill port extending into an interior of said fluid tank thereby facilitating said fluid tank to be filled with a lubricant, outer wall having a drain extending into said interior of said fluid tank thereby facilitating the lubricant to be drained through said drain;

wherein said assembly includes a pair of tie down straps, each of said tie downs straps being draped over said outer wall of said fluid tank, each of said tic down straps having a first end and a second end, each of said tie down straps including a pair of fasteners each being disposed on a respective one of said first end and said second end, each of said fasteners on each of said tie down straps being fastenable to said frame of said dump truck for securing said fluid tank on said frame;

wherein said assembly includes a drain plug being removably positioned in said drain in said outer wall of said fluid tank for closing and opening said drain; and wherein said assembly includes a lid being removably engaged to said fill port in said outer wall of said fluid tank for opening and closing said fill port.

2. The assembly according to claim 1, wherein said pump has an intake line extending through said outer wall of said fluid tank and into said interior of said fluid tank, said pump having an output line having a coupling being disposed on a distal end of said output line, said pump urging the lubricant inwardly through said intake line and outwardly through said output line when said pump is turned on.

3. A nozzle and tank assembly for spraying a lubricant onto an interior of a dump truck bed thereby inhibiting cargo in the bed from sticking to the bed, said assembly comprising:

a dump trailer being attachable to a truck, said truck having a frame and a cab;

a fluid tank being mountable to said frame of said truck such that said fluid tank is positionable in behind said cab;

a pump being disposed on said fluid tank, said pump being in fluid communication with said fluid tank for pumping the lubricant in said fluid tank;

a control being positionable within said cab wherein said control is configured to be accessible to a driver of said truck, said control being in communication with said pump for turning said pump on and off;

a spray bar being attached to said dump trailer, said spray bar having a plurality of spray nozzles each being directed into said dump trailer;

a supply line being fluidly attached to said pump such that said supply line receives the lubricant when said pump is turned on, said supply line being fluidly coupled to said spray bar such that said supply line delivers the lubricant to said spray bar thereby facilitating said spray nozzles on said spray bar to spray the lubricant into said dump trailer wherein said lubricant is configured to inhibit cargo from sticking to said dump trailer when said dump trailer is actuated into a dumping condition;

wherein said spray bar has a horizontal tube being mounted to a front wall of said dump trailer having said horizontal tube being horizontally oriented, each of said plurality of spray nozzles being fluidly coupled to said horizontal tube having said plurality of spray nozzles being spaced apart and being distributed along said horizontal tube, each of said plurality of spray nozzles extending through said front wall of said dump trailer such that a distal end of each of said plurality of spray nozzles is positioned inside of said dump trailer, said distal end of each of said plurality of spray nozzles being substantially open for spraying the lubricant; and wherein said spray bar includes a feed tube being fluidly coupled to said horizontal tube, said feed tube being routed along said front wall of said dump trailer to terminate at a coupling point on said dump trailer.

4. The assembly according to claim 3, wherein:

said pump has an output line;

said supply line has a first end being fluidly coupled to said output line of said pump, said supply line being routable along said frame of said truck, said supply line having a second end;

said assembly includes a first coupler being attached to said coupling point on said dump trailer, said first coupler being fluidly coupled to said feed tube; and said assembly includes a second coupler being fluidly attached to said second end of said supply line, said second coupler being releasably matable to said first coupler thereby facilitating said supply line to be in fluid communication with said feed tube of said spray bar.

5. A nozzle and tank assembly for spraying a lubricant onto an interior of a dump truck bed thereby inhibiting cargo in the bed from sticking to the bed, said assembly comprising:

a dump trailer being attachable to a truck, said truck having a frame and a cab;

a fluid tank being mountable to said frame of said truck such that said fluid tank is positionable in behind said cab, said fluid tank having an outer wall, said fluid tank having a plurality of feet each being integrated into said outer wall, each of said plurality of feet being capable of resting on top of said frame, said outer wall having a fill port extending into an interior of said fluid tank thereby facilitating said fluid tank to be filled with a lubricant, outer wall having a drain extending into said interior of said fluid tank thereby facilitating the lubricant to be drained through said drain;

a pair of tie down straps, each of said tie downs straps being draped over said outer wall of said fluid tank, each of said tie down straps having a first end and a second end, each of said tie down straps including a pair of fasteners each being disposed on a respective one of said first end and said second end, each of said fasteners on each of said tie down straps being fastenable to said frame of said dump truck for securing said fluid tank on said frame;

a drain plug being removably positioned in said drain in said outer wall of said fluid tank for closing and opening said drain;

a lid being removably engaged to said fill port in said outer wall of said fluid tank for opening and closing said fill port;

a pump being disposed on said fluid tank, said pump being in fluid communication with said fluid tank for pumping the lubricant in said fluid tank, said pump having an intake line extending through said outer wall of said fluid tank and into said interior of said fluid tank, said pump having an output line having a coupling being disposed on a distal end of said output line, said pump urging the lubricant inwardly through said intake line and outwardly through said output line when said pump is turned on;

a control being positionable within said cab wherein said control is configured to be accessible to a driver of said truck, said control being in communication with said pump for turning said pump on and off;

a spray bar being attached to said dump trailer, said spray bar having a plurality of spray nozzles each being directed into said dump trailer, said spray bar having a horizontal tube being mounted to a front wall of said dump trailer having said horizontal tube being horizontally oriented, each of said plurality of spray nozzles being fluidly coupled to said horizontal tube having said plurality of spray nozzles being spaced apart and being distributed along said horizontal tube, each of said plurality of spray nozzles extending through said front wall of said dump trailer such that a distal end of each of said plurality of spray nozzles is positioned inside of said dump trailer, said distal end of each of said plurality of spray nozzles being substantially open for spraying the lubricant, said spray bar including a feed tube being fluidly coupled to said horizontal tube, said feed tube being routed along said front wall of said dump trailer to terminate at a coupling point on said dump trailer;

a first coupler being attached to said coupling point on said dump trailer, said first couple being fluidly coupled to said feed tube;

a supply line being fluidly attached to said pump such that said supply line receives the lubricant when said pump is turned on, said supply line being fluidly coupled to said spray bar such that said supply line delivers the lubricant to said spray bar thereby facilitating said spray nozzles on said spray bar to spray the lubricant into said dump trailer wherein said lubricant is configured to inhibit cargo from sticking to said dump trailer when said dump trailer is actuated into a dumping condition, said supply line having a first end being fluidly coupled to said output line of said pump, said supply line being routable along said frame of said truck, said supply line having a second end; and a second coupler being fluidly attached to said second end of said supply line, said second coupler being releasably mountable to said first coupler thereby facilitating said supply line to be in fluid communication with said feed tube of said spray bar.

* * * * *